Sept. 26, 1944.  J. H. SHERTS  2,359,163
STRUCTURE FOR GLAZING UNITS
Filed March 19, 1942
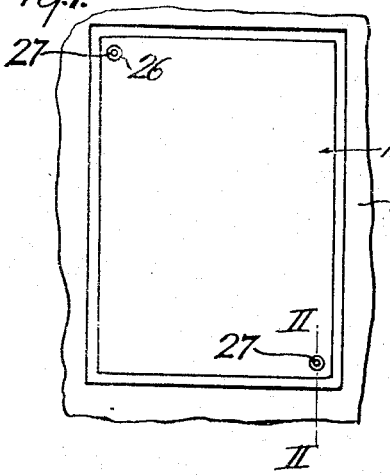
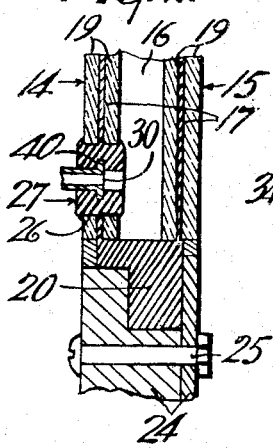
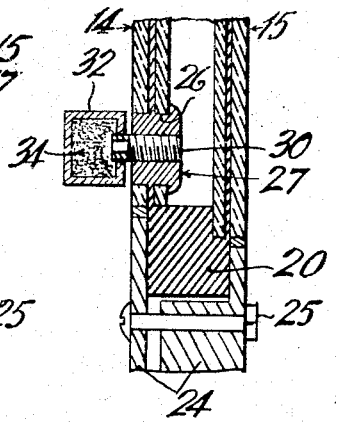
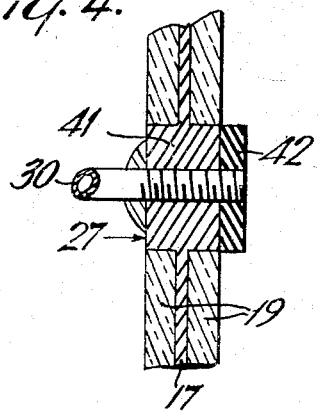
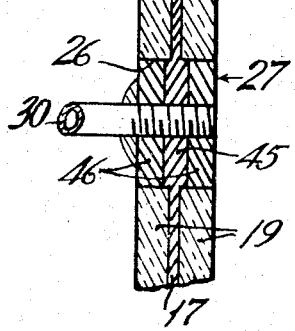
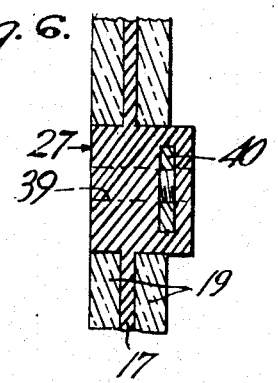
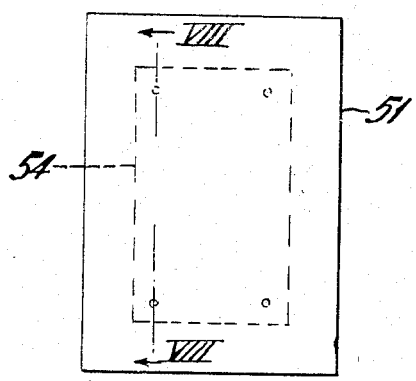
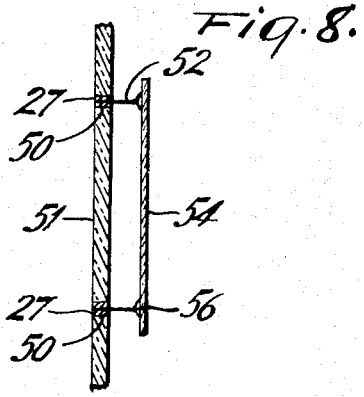
Inventor
James Hervey Sherts
By Olen E Bee
Attorney Patented Sept. 26, 1944

2,359,163

UNITED STATES PATENT OFFICE 2,359,163

STRUCTURE FOR GLAZING UNITS

James Hervey Sherts, Pittsburgh, Pa., assignor to Pittsburgh Plate Glass Company, Allegheny County, Pa., a corporation of Pennsylvania Application March 19, 1942, Serial No. 435,386

8 Claims. (Cl. 20—40)

This invention relates to glazing panels and has particular relation to perforated panels in which yieldable elements fill the perforations.

One object of the invention is to provide an improved yieldable mounting in a glass panel to support an element free from direct contact with the glass.

Another object of the invention is to provide for communication through a laminated glass panel and for the attachment of metal or other hard elements to the panel in yieldable relation without imposing destructive strains upon the glass of the panel.

Another object of the invention is to provide an improved structure to facilitate communication from the outside to the inside of a multiple glazed unit.

The invention is exemplified in a glass panel structure in which a plastic plug is bonded to the glass in an opening in the panel. The plug is adapted to receive a nipple or pin upon which various types of attachments can be supported yieldably. This type of plug is especially applicable to laminated glass panels in which a plastic interlayer can be integrally bonded to the plug and thus maintain firm anchorage of the latter. Arrangements of this kind can be employed in vehicles, airplanes or buildings of various kinds in which multiple glazed units are adapted to be installed. The invention can also be applied to plain glass sheets which have not been laminated.

In the drawing:

Fig. 1 is a diagrammatic fragmentary elevation of a glazing unit; Fig. 2 is a vertical section on a larger scale taken substantially along the line II—II of Fig. 1; Fig. 3 is a vertical section similar to Fig. 2 and illustrating another form of structure; Figs. 4, 5 and 6 are vertical sections of laminated panels in which different forms of plugs have been anchored; Fig. 7 is an elevation of a panel which has not been laminated; Fig. 8 is a vertical section taken substantially along the lines VIII—VIII of Fig. 7.

In practicing the invention, a closure unit 10 primarily composed of glass is mounted in a supporting frame 11 which can be part of an airplane wall, automobile body, or building structure. According to one form of the invention, the unit 10 comprises a double glazed construction in which safety glass panels 14 and 15 are spaced in parallel relation to form an air chamber 16 between them. Organic plastic, such as vinyl acetal resin, is employed as interlayer material 17, and glass plates 19 of each panel are bonded to opposite sides of the interlayer 17. Cellulose acetate and methyl acrylate resins have also been employed as interlayer material in laminating glass and it is to be understood that the invention is applicable to structures in which such resins may be used.

Edge or projecting portions of the interlayer 17 can be built up to form integral plastic extensions 20 bridging the space between the edges of the laminated units 14 and 15. In installing the multiple glazed unit 10, frame elements 24 are clamped upon opposite sides of the extension 20 by means of fasteners 25. The double glazed unit is thus yieldably mounted in the frame elements without exerting any clamping forces upon the glass itself.

Under certain conditions it is desirable to circulate air through the chamber 16 between the laminated panels 14 and 15. Instead of perforating or recessing the plastic engaging portions 24 of the frame and the extended portions of the plastic itself, it has been found that openings 26 formed through the safety glass facilitate the installation of the air circulating elements. These openings can be formed at convenient locations, for example, adjacent corner portions of the panel. Such openings can be formed before the glass is laminated and the interlayer 17 positioned in a conventional manner between the glass plates without forming openings in the latter. Additional plastic of the type employed as interlayer material is applied to opposite sides of the latter to fill the opening and then the unit is subjected to heat and pressure in an autoclave according to conventional practice in the lamination of safety glass. A plug 27 in the opening is thus formed integrally with the interlayer 17. After the panel has been thus formed, the plug (Fig. 3) is centrally bored or tapped and a support in the form of a nipple 30 is screw threaded or otherwise secured therein. The nipple of each plug can communicate with a suitable air circulation system (not shown). Likewise, this type of construction can be combined with a container 32 threaded or otherwise secured upon the nipple and designed to contain a desiccant 34, such as activated alumina, silica gel, calcium chloride, or phosphorous pentoxide.

It is to be understood that the plug 27 can be applied before or after the safety glass has been laminated. If desired, the portion of the interlayer 17 traversing the opening is cut from such opening preparatory to insertion of the plug 27 therein. Sufficient heat is applied to the unit to bond the inserted plug integrally to the surrounding edges of the interlayer in the opening and also to the walls of the glass defining the opening.

The plug 27 can be in the form of hard resin, that is, resin which has a low percentage of plasticizer. For example, in the vinyl acetal type of resin, 15 to 30 per cent of plasticizer, such as triglycol dihexoate, is sufficient to impart proper hardness to the plug. After the plug is inserted, the safety glass panel is subjected to sufficient heat to bond the interlayer integrally with the plug. This operation can be accomplished at approximately 180 degrees F.

In the arrangement shown in Figs. 2 and 6, the plug 27 of resin is provided with an internally threaded metal disk or anchoring nut 40 embedded therein. The support 30 in the form of a nipple is anchored in the plug and to the nut 40 and can be employed as a support for a suitable attachment of the type described above. Likewise the plug in connection with these figures can be in the form of resin of the same type as that described above. In Fig. 6 the plug is shown before it has been bored, broken lines 39 indicating the area to be bored or tapped.

In Fig. 4, the plug 27 includes a central or body portion 41 integral with, or as a part of the interlayer, and in addition an outer button 42 of hard resin is bonded integrally to the central portion. The plug 27, including the button 42, is adapted to receive the nipple 30 threaded or otherwise secured therein. The hard resin button provides for stronger anchorage of the plug.

In Fig. 5, the plug 27 includes an interlayer portion 45 traversing the opening 26 and having hard resin buttons 46 bonded integrally on opposite sides thereof. The composite plug 27 thus formed receives the nipple bonded or screw threaded therein.

In the application of the invention shown in Figs. 7 and 8, the plugs 27 are applied in openings 50 of a glass unit 51. Pins or studs 52 of metal, wood, hard resin, or other stiff material, are anchored in the plug in the same manner as the nipples 30 are applied in the structures previously described. The pins 52 carry a panel 54, such as a reflector sight rear vision mirror secured thereto, as indicated at 56, in any suitable manner. The panel 54 is thus yieldably mounted and in addition to supporting the panel 54 in a desired position, the plugs also absorb shocks to which the panel may be subjected.

It is to be understood that laminated glass can be manufactured with the plug 27 unbored (Fig. 6), with or without the nut 40 included therein. Later the plug can be bored or tapped to adapt it to whatever type of attachment that may be required for a particular installation. In a multiple glazed unit the chamber between glass plates can thus be sealed until ready for use.

Although several forms of the invention have been shown and described in detail, it will be apparent to those skilled in the art that the invention is not so limited, but can be included in other forms without departing from the spirit of the invention or from the scope of the appended claims.

I claim:

1. A glazing unit comprising an interlayer of organic plastic, glass sheets bonded to opposite sides of the interlayer and forming therewith a laminated structure, said laminated structure having an opening passing therethrough, and plastic material integral with the plastic interlayer disposed in said opening.

2. A glazing unit comprising an interlayer of organic plastic, glass sheets bonded to opposite sides of the interlayer and forming therewith a laminated structure, said laminated structure having an opening passing therethrough, plastic material integral with the plastic interlayer disposed in said opening, and a perforated disk at least partially embedded in the plastic material that is disposed in said opening.

3. A glazing unit comprising an interlayer of organic plastic, glass sheets bonded to opposite sides of the interlayer and forming therewith a laminated structure, said laminated structure having an opening passing therethrough, a perforated plastic plug integral with the plastic interlayer disposed in said opening, and a nipple connected in the perforated portion of said plug to communicate from one side of the laminated structure to the other.

4. A glazing unit comprising an interlayer of organic plastic, glass sheets bonded to opposite sides of the interlayer and forming therewith a laminated structure, said laminated structure having an opening passing therethrough, and plastic material stiffer and harder than the plastic interlayer integrally bonded with the latter in said opening.

5. A glazing unit comprising an interlayer of organic plastic, glass sheets bonded to opposite sides of the interlayer and forming therewith a laminated structutre, said laminated structure having an opening passing therethrough, a perforated plastic plug integral with said interlayer and disposed in said opening, a perforated disk at least partially embedded in said plug, and a nipple disposed in the perforated plug and connected to said disk for communicating from one side of the laminated structure to the other.

6. A glazing unit comprising an interlayer of organic plastic, glass sheets bonded to opposite sides of said interlayer and forming therewith a laminated structure, said structure having an opening passing therethrough, a plastic plug integral with said interlayer disposed in said opening, at least a portion of said plug being relatively hard and adapted to receive a connection in anchored relation thereto.

7. A glazing unit comprising an interlayer of organic plastic, glass plates bonded to opposite sides of said interlayer and forming therewith a laminated structure, said structure having an opening passing therethrough, a plastic plug integral with said interlayer and disposed in said opening, and a support anchored in said plug free from contact with the glass plates.

8. A glazing unit comprising a glass panel having an opening therethrough, a plastic plug disposed in said opening and having its peripheral wall bonded to the wall of the opening, and a support harder than the plastic plug anchored in the latter.

JAMES HERVEY SHERTS.